Jan. 9, 1951 A. WNETRZAK 2,537,387
SLAUGHTERING PEN
Filed Nov. 10, 1947 2 Sheets-Sheet 1
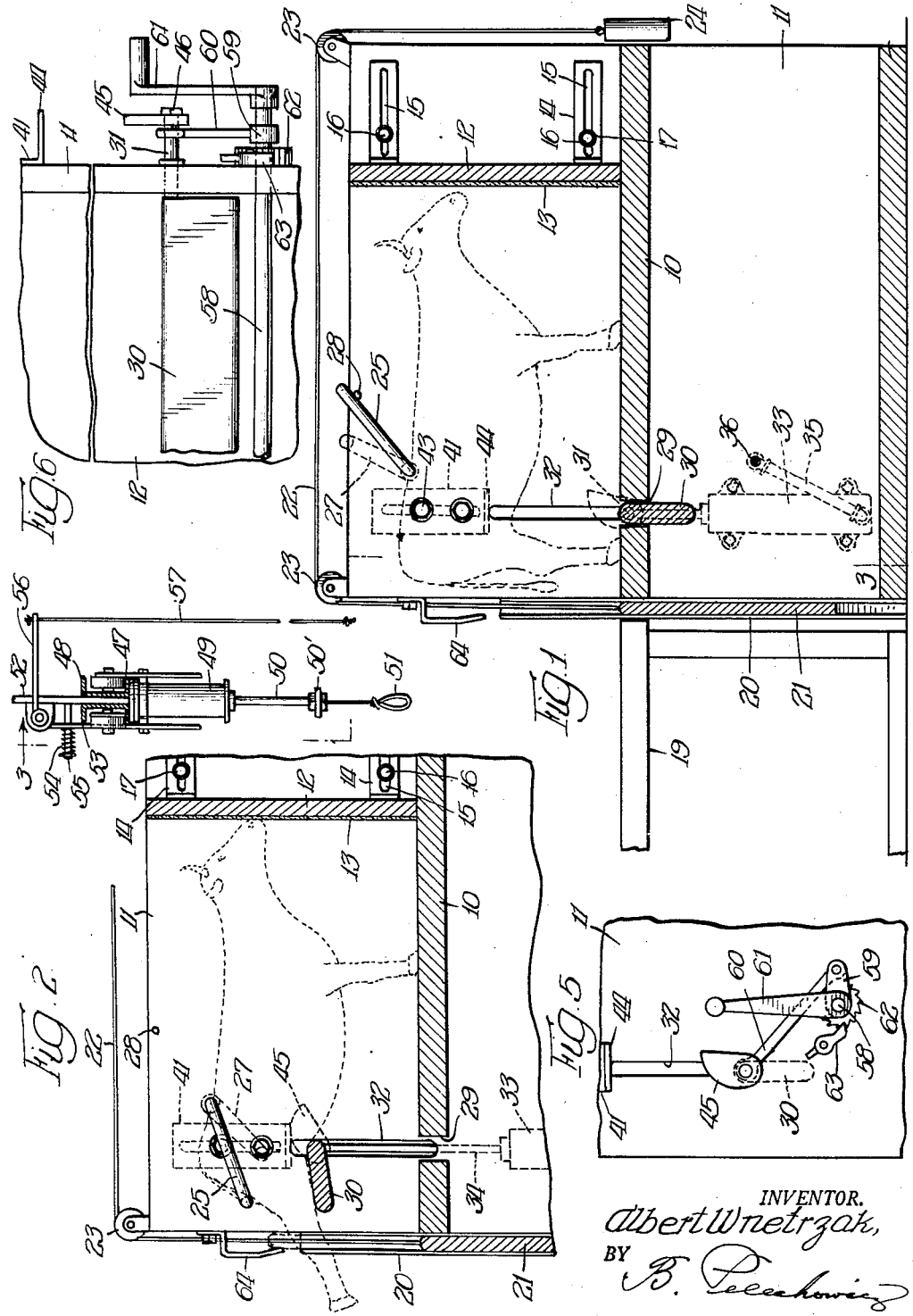
INVENTOR.
Albert Wnetrzak,
BY
ATTY.

Jan. 9, 1951 A. WNETRZAK 2,537,387
SLAUGHTERING PEN
Filed Nov. 10, 1947 2 Sheets-Sheet 2
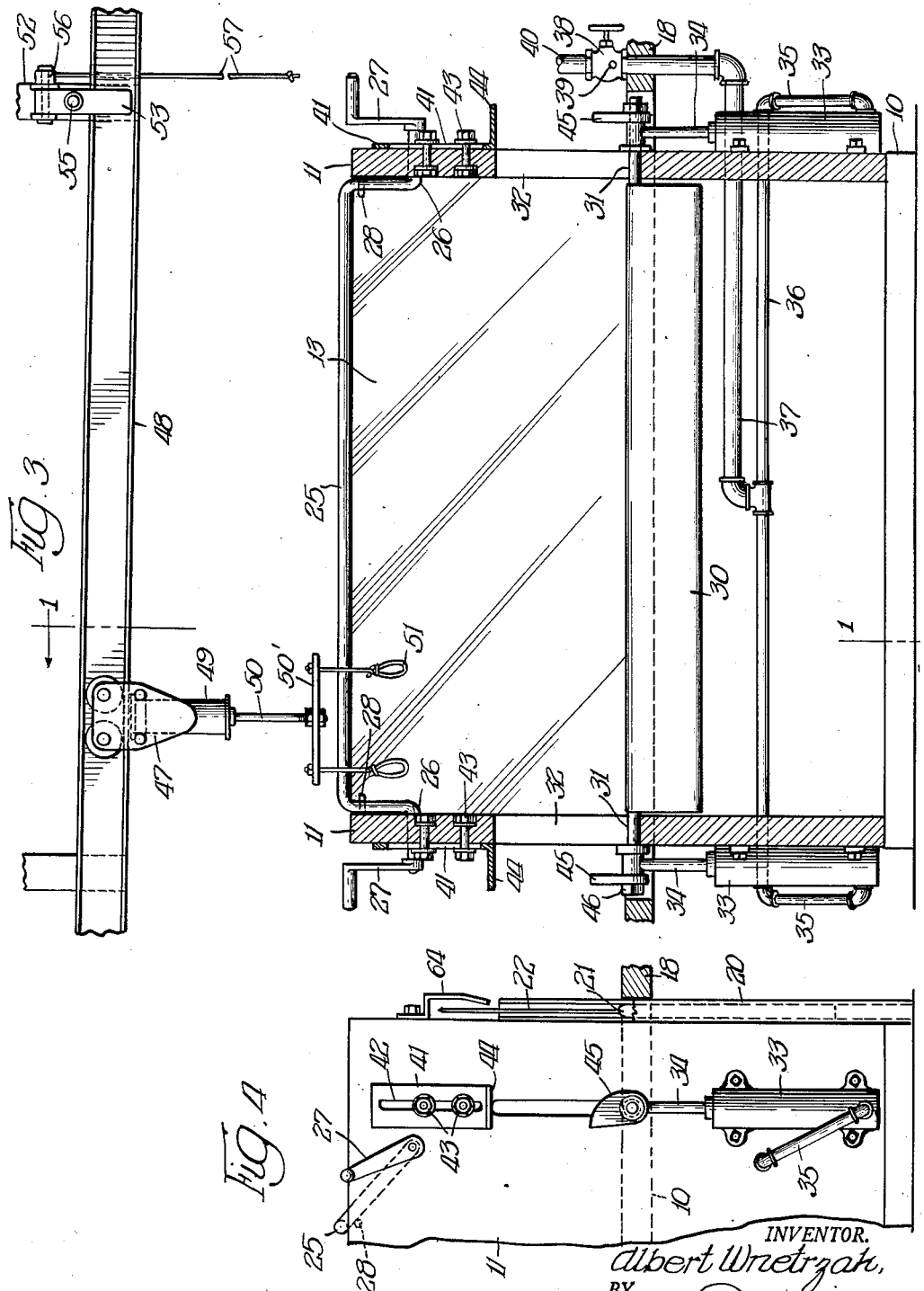
INVENTOR.
Albert Wnetrzak, Patented Jan. 9, 1951

2,537,387

UNITED STATES PATENT OFFICE 2,537,387

SLAUGHTERING PEN

Albert Wnetrzak, Chicago, Ill.

Application November 10, 1947, Serial No. 785,155

14 Claims. (Cl. 17—1)

This is a continuation-in-part of an abandoned application for patent on a slaughtering pen, filed February 19, 1945, Serial No. 578,690.

The present invention relates to slaughtering apparatus, and has for its main object the provision of a pen into which animals to be slaughtered are driven, with means provided therein for engaging the hind legs of the animals and raising the same into a substantially horizontal position so as to engage the legs by a suitable hoist for hanging an animal preparatory to the slaughtering operation.

Another object of the present invention is the provision of a slaughtering pen which may be adjustable in length for receiving therewithin animals of different sizes such as sheep, pigs and cattle.

A still further object of the present invention is the provision of means movable over the pen for engaging the buttock of an animal preventing its rearing or backing prior to and during the operation of the device for raising the animal's hind legs.

A still further object of the present invention is the provision of means for varying the height at which the leg raising device should operate, in conformity with the height of an animal on which the same is to operate.

Another object of the present invention is the provision of pneumatic and manual actuating means for leg raising device.

With the above general objects in view and others that will appear as the invention is better understood, the same consists in the novel construction, combination and arrangement of parts hereinafter more fully described, illustrated in the accompanying drawings and pointed out in the appended claims.

In the drawings forming a part of this application and in which like designating characters refer to corresponding parts throughout the several views:

Fig. 1 is a cross-sectional view through a slaughtering pen in accordance with the present invention, the view having been taken substantially on line 1—1 of Fig. 3;

Fig. 2 is a similar view with the leg raising device in an operative position;

Fig. 3 is a transverse cross-sectional view through the pen, taken on line 3—3 of Fig. 1;

Fig. 4 is a side elevational view of pneumatic actuating means for the leg raising device;

Fig. 5 is an end elevational view of manually operable actuating means for leg raising device; and Fig. 6 is a fragmentary rear elevational view of the latter means.

In safely and quickly handling cattle and other animals for slaughtering, much time is lost and much injury is suffered by the animal handlers during the process of engaging the hind legs and handling the animals to be slaughtered. By employing the present invention, an animal becomes helpless as soon as it enters a slaughtering pen, constituting a part of the invention. As soon as the animal enters the pen the leg raising device is set in operation for lifting animal's hind legs and bringing them to a substantially horizontal position for conditioning the same to be grasped by a vertical lift or hoist. The lift is mounted upon a conveyor which slopes downwardly, carrying the animal by gravity away from the pen to be slaughtered so that a new lot of animals may be driven into the pen.

Referring in detail to the present drawings there is shown a pen having floor 10, rigid side walls 11 and movable end wall 12. Said end wall is adjustable to accommodate animals of different lengths in the pen, and on the inside surface of the said end wall is reflector 13, preferably made of polished stainless steel or other similar material to confuse an animal by its own reflection. The end wall is made adjustable in any suitable manner such as by fastening plates 14 near the top and bottom at the outer side of said wall 12 near the ends thereof and adjacent side walls 11. Each plate 14 has slot 15 through which fastening bolt 16 extends from each of side walls 11, and which receives fastening nut 17 thereon for holding said end wall in any adjusted position in conformity with the length of an animal to be received in the pen.

Floor 10 of the slaughter pen is on the same horizontal level as slaughter house floor 18. The lower end of the slaughter pen may be countersunk below the slaughter house floor 18. Said slaughter house floor 18 may surround the slaughter pen on all of its sides, or optionally, portion of the slaughter house floor 18 may be removed in the area adjacent the front end of the slaughter pen, and in lieu thereof ramp 19, which is on the same horizontal level as floors 10 and 18, may be substituted.

Affixed to the front end of each side wall 11 is guiding rail 20, the two of said rails receiving board 21, for guiding the same in its upward movement. Affixed to each end of said board 21 is cord 22, passed over pulleys 23, which are mounted upon the upper ends of side walls 11. Counter-weights 24 suspended upon the opposite ends of cords 22 assist said board 21 for upright shifting movement.

Locking bar 25 in the form of a bail, by its extremities 26 is passed through side walls 11. The outer ends of said extremities 26 which project beyond the outer faces of side walls 11 receive in a rigid engagement crank handles 27, by means of which the bail of said bar 25 may be brought to an inoperative position shown in Fig. 1, or to its operative position illustrated in Fig. 2. In the inoperative position, past the vertical plane, said bail 25 is supported by stop pins 28 projecting from the inner faces of side walls 11 and engaging the transverse arms of said locking bar 25. In the operative position said locking bar is swung into the opposite direction from said stop pins 28 to engage the animal's buttock as indicated in Fig. 2.

A short distance from the front end of floor 10 is a transverse slot 29 made therein, in which leg elevating board 30 is seated for vertical movement. Said leg elevating board 30 has bar 31 extending therefrom, at its upper end, providing trunnions or pins at its opposite ends which pass through guides or slots 32 made in side walls 11. This board 30 is shiftable forwardly of the hind legs of the animals in the slaughtering pen, and in an upright direction, and substantially along the plane of the corner defined by the animal's hind leg and its flank. Mechanism is provided for shifting said leg elevating board 30 into a substantially horizontal position as the same has substantially reached the upper ends of said slots 32, for the purpose of bearing against animal's legs in the region of the stifles in order to shift the hind legs to a substantially horizontal position, illustrated in Fig. 2.

The mechanism for operating said leg elevating board 30 in a manner hereinabove specified includes plunger cylinder 33 secured to the outer face of each side wall 11 and below floor 10, and each having a plunger secured therein with an outwardly extending plunger rod 34 in contact with the adjacent end of mounting bar 31. Pressure is applied to the lower end of each cylinder 33 through pipes 35 and 36. Connecting with pipe 36 in a central relation, is manifold 37, which is disposed in a parallel relation with pipe 36, and extends horizontally through one of said side walls 11 and then vertically through and above floor 10. There said manifold is provided with valve 38, which may be provided with bleed-cock 39 for gradually lowering bar 31 after it has been operatively raised and the valve turned off. Fluid, such as steam or compressed air is supplied through supply pipe 40 with which said manifold 37 connects. Since said manifold 37 connects centrally with pipe 36 equal amount of pressure will be applied at both ends of board 30. Manifold 37 is preferably twice the diameter of the diameter of pipe 36 in order that the pressure in pipes 35 and 36 and in manifold 37 may be uniform.

The leg elevating board 30 is shifted in slots 32 to a height depending upon the height of any animals in the pen. The extent of the upward shifting movement of board 30 is therefore regulated by means of gage plates 41 each adjustably secured to the outer face of each side wall 11 by means of vertical slot 42 and fastening bolts 43 extending through the slot and into the side wall. Each plate 41 is provided with flange 44 extending from the lower end of each plate 41 and in a transverse relation with slot 32, for the purpose of limiting the upward movement of leg board supports 31, by raising or lowering plate 41 upon bolts 43.

Means for inclining leg board 30 into a horizontal position as said board approaches said flanges 44 in its upward shifting movement, for engaging animal's legs along the regions of the stifles thereof, as is seen in Fig. 2, includes an eccentric or cam 45, which is rigidly secured to supports 31 by means of bolts 46 which are in a threaded engagement with said supports 31, and which by their heads clamp said cams 45 to the ends of said supports 31. As board 30 shifts upwardly, the free ends of said cams 45 come in contact with flanges 44, and as the pressure in cylinders 33 upon plunger rods 34 continues, cams 45 are forced to shift angularly, with the arcuate edges thereof coming in contact with the undersurfaces of flanges 44. This operation brings cams 45 to a substantially horizontal position, as is seen in Fig. 2, and since said cams 45 are in a rigid connection with board 30 through supports 31, the angular shifting movement of said cams 45 is imparted to board 30, thereby bringing said board into a horizontal position for engaging and pressing against the stifle regions of an animal's hind legs for bringing the latter into a substantially horizontal position, illustrated in Fig. 2. Preceding this operation of board 30 locking bar 25 is brought down upon and rearwardly of an animal's buttock. Board 21 is then brought into a downward position below floor 10 in order that the same may not interfere with the rearward shifting movement of an animal's hind legs as the same are shifted into a substantially horizontal position by the action of board 30 as hereinabove described.

It is noted that when the animals have been driven into the pen board 21 is then shifted upwardly in order to prevent their rearing and for conditioning them for proper posture while in the pen and for proper operation of board 30. When locking bar 25 has been brought down for preventing animal's rearing, board 21 is then shifted downwardly and board 30 is set in operation for the purposes hereinabove described.

By virtue of the foregoing successive operations, board 21 being in a downwardly shifted position, there is nothing to interfere for animals' legs to extend beyond the front end of the pen and past the plane of shifting of board 21. It is further observed that locking bar 25 while bearing downwardly upon animal's hind legs in the buttock region from above assists the function of board 30 while the latter exerts pressure upon animal's hind legs from below in order to bring the same into a substantially horizontal position. Of course, during the hind legs raising operation the animal supports itself upon its front legs.

When animals' hind legs have been conditioned as aforesaid, a number of conveyers 47 movable on overhead track 48, are moved opposite the rear end of each animal. Each conveyer carries an electrically or pneumatically operable hoist 49, including a vertically shiftable bar 50 and cross bar 50' carried thereby. The latter is provided at each of its end with hooks or flexible loops 51 adapted to be equally engaged with the rear hoofs or feet of an animal.

The entire hoist track 48 may be raised by means of end supports 52, movable upwardly to swing the animals by means of their hind legs and suspend them above the pen. Track 48 is preferably inclined downwardly so that conveyors 47 will roll by gravity downwardly on track 48, thus removing the animals from the slaughter pen.

At the lower end of track 48 is stop arm 53 pivoted on the adjacent support 52 and held in position adjacent said track by spring 54 surrounding the outer end of bar 55 extending through stop arm 53 and pressing said arm into the path of one of the conveyor rollers on the track. Oppositely extending release arm 56 is connected at the pivot end of arm 53 so that when the free end of release arm 56 is moved downwardly by pull cord 57, stop arm 53 is moved out of the path of the conveyor roller against the pressure of spring 54 allowing the conveyors to move downwardly by gravity on track 48, thereby clearing the space above the slaughter pen.

The slaughter pen is first adjusted in length by varying the position of end wall 12 depending upon the length of the animals to be slaughtered. A proper number of animals are then driven into the pen and arranged parallel with side walls 11 thereof with the animals' hind quarters adjacent the open end of the pen, in the proximity of board 21. During the process of arranging the animals in the pen board 21 may be raised, but as soon as locking bar 25 has been brought downwardly to engage the animals' buttocks, and prior to the operation of board 30, said board 21 is shifted into its inoperative position, as shown in Fig. 2. When animals' hind legs have been brought to a substantially horizontal position by the action of board 30, the legs of each animal are then engaged by loops 51 of the elevating conveyer, and the animals are then all bodily raised by the conveyers free from the pen and are then moved away from the pen, which is then ready for reception of the next group of animals.

As soon as loops 51 have been engaged with the animals' hind legs locking bar 25 is raised into its inoperative position in engagement with stop pins 28. Thereupon hoist 49 is set in operation for upward shifting of bar 50, cross bar 50' and loops 51 with the animal suspended upon the latter. During this time, pressure on the leg elevating board 30 is taken off, permitting the pressure in cylinders 33 to gradually spend itself through bleed-cock 39, for returning said board 30 to a vertical position. As soon as cams 45 become disengaged from flanges 44, during the downward shifting of said board 30, the latter assumes vertical position due to gravity, bringing cams 45 to the same position by virtue of rigid connection therewith through supports 31, until said board 30 reaches its lowermost position in slot 29, and flush with floor 10 of the pen. By the time the animals' front extremities, including their heads, reach said slot 29, by the operation of hoist 49, said board 30 remains in its inoperative, retracted position within slot 29, as seen in Fig. 1.

The mechanism for shifting leg elevating board 30, operable manually, is shown in Figs. 5 and 6, and includes shaft 58 mounted for rotary movement within side walls 11, and extending by its end outwardly of one side wall 11, and below slaughter house floor 18. Said shaft 58 is on a plane laterally removed from the plane of slots 32 and from the plane upon which said board 30 shifts. Rigidly mounted upon said shaft 58 by one of its ends is link 59, which by its other end pivotally connects with the lower end of arm 60. Said arm 60 by its upper end is in a free pivotal connection with support 31. The free end of said shaft 58 has crank handle 61 rigidly keyed thereto. In the inoperative position of board 30 said link 59, arm 60 and crank handle 61 remain substantially in the position illustrated in Fig. 5. To shift board 30 upwardly to its operative position, crank handle 61 is turned into a counter clock-wise direction, as viewed in Fig. 5. This operation turns link 59 into an upward direction, which in turn exerts pressure upon support 31 for shifting the same upwardly within slot 32 for raising said board 30. Otherwise the operation of board 30 and cams 45 is the same as hereinabove described. Preferably there should be two of the manually operable devices hereinabove described, one coacting with each support 31, at each end of board 30.

To maintain board 30 in its operative position, shown in Fig. 2, ratchet wheel 62 is keyed to shaft 58 and adjacent the outer face of side wall 11. Pawl 63 pivoted upon side wall 11 engages the teeth of ratchet wheel 62, and maintains shaft 58 locked for preventing its rotation into the opposite direction when board 30 has become elevated. When it becomes necessary to bring said board 30 to an inoperative position, pawl 63 is released from its engagement with ratchet wheel 62, thereby permitting said shaft to rotate into an opposite, clock-wise direction, as viewed in Fig. 5, for permitting downward shifting of board 30.

The manually operable means for shifting board 30 may optionally be used in lieu of the pneumatic means, particularly in smaller slaughter houses.

Hooks 64 affixed to the edges of side walls 11, adjacent their upper ends, limit the upward shifting movement of board 21.

When animal's legs have been brought to a substantially horizontal position by the action of leg board 30, with loops 51 in engagement with the legs, hoist 49 should then be slightly raised, prior to the lowering of board 30, in order to take off the slack from loops 51 so as to prevent shaking off of said loops 51 by the animal.

As is apparent from the hereinabove description, one of the advantages of raising the animal's legs by leg board 30 preparatory to the engagement thereof by hoist 49, resides in the fact that it eliminates the necessity of stooping or bending down by the animal handlers.

It will also be seen that animals of various sizes may be quickly and easily handled without danger to the operators and without unnecessarily exciting the animals. Although a single pen is shown, a larger number of similar pens may be arranged in alinement to be served by the same track and conveyer system.

While there is described herein preferred embodiments of the present invention, it is nevertheless to be understood that minor changes may be made therein without departing from the spirit and scope of the invention as claimed.

What I claim as new is:

1. In a slaughtering apparatus, a device for raising an animal's legs to a substantially horizontal position for facilitating the engagement thereof by a hoist, comprising a housing having upstanding side walls with vertical guides thereon, a board positioned within said housing, extensions on said board slidably and rotatably connected to said guides, means connected to said board and housing for shifting said board in an upright direction, eccentric means on said board, means carried by said housing for limiting the upright shifting movement of said board, and means on said housing for imparting an angular shifting movement to said eccentric means and said board for turning said board to a substantially horizontal position, said last named means being located in the path of movement of said eccentric means adjacent the upper limit of its travel so as to contact said eccentric means to cause said board to rotate as it approaches the limit of its upright shifting movement.

2. In a slaughtering apparatus, a device for raising an animal's legs to a substantially horizontal position for facilitating the engagement thereof by a hoist, comprising a housing having upstanding side walls with vertical guides thereon, a board positioned within said housing, extensions on said board slidably and rotatably connected to said guides, means connected to said board and housing for shifting said board in an upright direction, eccentric means on said board, adjustable means carried by said housing for limiting the upright shifting movement of said board, and adjustable means on said housing for imparting an angular shifting movement to said eccentric means and said board with one of its horizontal marginal portions as its axis for bringing said board to a substantially horizontal position, said last named means being located in the path of movement of said eccentric means adjacent its upper limit of travel so as to contact said eccentric means to cause said board to rotate as it approaches the limit of its upright shifting movement.

3. In a slaughtering apparatus, a device for raising an animal's legs to a substantially horizontal position for facilitating the engagement thereof by a hoist, comprising a housing having upstanding sides with guide members thereon, a board positioned within said housing, laterally extending projections on said board slidably and rotatably connected to said guide members, means connected to said board for shifting said board in an upright direction, a vertically adjustable plate on said housing for limiting the upright shifting movement of said board, and a cam on said board, said plate being positioned on said housing in the path of movement of said cam so as to contact said cam to cause said board to rotate as it approaches the limit of its upright shifting movement for imparting an angular shifting movement to said board for bringing the latter to a substantially horizontal position.

4. In a slaughtering pen, including a wall having a vertical slot therein, a leg board guided in the slot in said wall for vertical and rotary shifting movement, means connected to said board for shifting said leg board vertically, a plate carried by said wall, said plate being adjustable in a vertical direction, and a cam carried by said leg board, said plate being located on said wall in the path of movement of said cam so as to contact said cam as said leg board approaches the limit of its upright shifting movement for turning said leg board into a substantially horizontal position.

5. In a slaughtering pen having opposite side members adapted to receive an animal therebetween, a leg board extending transversely between the side members, trunnions at opposite ends of the leg board, means engaging the trunnions and mounting the leg board for turning movement and for bodily upward movement, abutments above the leg board, and projections connected with the leg board in position to engage said abutments upon upward movement thereof to cause turning of the leg board.

6. In a slaughtering pen having upright side members, upright mounting means on said side members, a leg board rotatably and slidably mounted on said mounting means, eccentric means on said leg board and movable therewith, projecting means on at least one of said side members located in the path of movement of said eccentric means adjacent the upper limit of travel thereof so as to contact the eccentric means to cause said leg board to rotate as said board approaches its upper limit of travel, and means connected to said leg board for shifting said leg board upwardly on said mounting means.

7. In a slaughtering pen having upright side members, said side members having substantially vertical slots therein, a leg board, a laterally extending projection on each side of said board extending into a slot on one of said side members for vertically and rotatably mounting said leg board in said pen, means connected to said leg board for vertically shifting said leg board in said pen, a cam on said leg board and movable therewith, and cam operating means on one of said side members located in the path of movement of said cam adjacent the upper limit of travel thereof so as to contact the cam to cause said leg board to rotate as said board approaches its upper limit of travel.

8. In a slaughtering pen having upright side members, substantially vertical mounting means on said side members, a leg board rotatably and slidably mounted on said mounting means, eccentric means on said leg board and movable therewith, projecting means adjustably mounted on at least one of said side members located in the path of movement of said eccentric means adjacent the upper limit of travel thereof so as to contact the eccentric means to cause said leg board to rotate as said board approaches its upper limit of travel, and means connected to said leg board for vertically shifting said leg board on said vertical mounting means.

9. In a slaughtering pen having upright side members, said side members having substantially vertical slots therein, a leg board, a laterally extending projection on each side of said board extending into a slot on one of said side members for vertically and rotatably mounting said leg board in said pen, means connected to said leg board for vertically shifting said leg board in said pen, a cam on said leg board and movable therewith, and cam operating means adjustably mounted on one of said side members located in the path of movement of said cam adjacent the upper limit of travel thereof so as to contact the cam to cause said leg board to rotate as said board approaches its upper limit of travel.

10. A slaughtering pen comprising a pair of upstanding side walls, each of said walls having a vertical slot therein, a leg board rotatably and slidably mounted in said slots, a cam on said leg board, cam actuating means on one of said side walls in position to co-act with said cam to cause said leg board to rotate, and means connected to said leg board for vertically sliding said board in the slots in said side walls to raise said board in the pen and to bring the cam into contact with said cam actuating means.

11. A slaughtering pen comprising a pair of upstanding side walls and a floor therein, each of said walls having a vertical slot therein and said floor having a transverse slot therein, a leg board slidably and rotatably mounted in the slots in said side walls and slidably extending into the slot in said floor, a cam on said leg board, cam actuating means on one of said side walls in position to co-act with said cam to cause said leg board to rotate, and actuating means connected to said leg board for vertically sliding said board in said slots to raise said board in the pen and to bring the cam into contact with the cam actuating means.

12. A slaughtering pen comprising a pair of upstanding side walls, each of said walls having a vertical slot therein, a leg board rotatably and slidably mounted in said slots, means connected to said leg board for vertically shifting said leg board in said pen, a cam on said leg board, cam actuating means on one of said side walls located in the path of movement of said cam adjacent its upper limit of travel in position to co-act with said cam to cause said leg board to rotate, and a bail rotatably mounted on said side walls adjacent said cam actuating means and positioned so as to bear against the back of an animal standing in said pen, said bail being positioned in said pen in respect to the leg board so as to co-act therewith to clamp the back and legs of an animal therebetween.

13. In a slaughtering pen having upright side members, said side members having substantially vertical slots therein, a device for turning the hind legs of an animal standing therein rearwardly into a substantially horizontal position preparatory to the grasping of the legs by a hoist, comprising a bail rotatably mounted on said upright side members adjacent the upper ends of said slots in position to bear against the buttocks of said animal, a leg engaging member having laterally extending projections on each side thereof extending into the slots in said side members for slidably and rotatably mounting said leg engaging member in said pen, said leg engaging member being located transversely of said pen in position so as to be positioned between the fore legs and hind legs of an animal standing therein, means connected to said leg board for vertically shifting said leg engaging member in said pen, eccentric means on one of said projections and movable therewith, and projecting means on one of said side members located in the path of travel of said eccentric means adjacent the upper limit of travel thereof so as to contact the eccentric means to cause said leg engaging member to turn into a substantially horizontal plane toward the stifles of said animal as said leg board approaches its upper limit of travel, the leg member and bail embracing the stifles of said animal therebetween.

14. In a slaughtering apparatus having upstanding side members, a device for turning the hind legs of an animal standing in said apparatus rearwardly into a substantially horizontal position for facilitating the engagement thereof by a hoist comprising a buttocks engaging member rotatably mounted on the side members in position to bear against the hind quarters of the animal, upright guide means on said side members, a leg engaging member rotatably and slidably mounted on the guide means, means connected to said leg engaging member for shifting said leg engaging member vertically, means carried by said leg engaging member for turning the latter rearwardly into a substantially horizontal position, and projecting means on one of said upstanding side members located in the path of travel of the means carried by said leg engaging member and to abut thereagainst as said leg engaging member approaches its upper limit of travel, said leg engaging member when engaged with the animal's stifles co-acting with said buttocks engaging member for turning the animal's hind legs rearwardly into a substantially horizontal position.

ALBERT WNETRZAK.

REFERENCES CITED

The following references are of record in the file of this patent:

UNITED STATES PATENTS

| Number | Name | Date |
| --- | --- | --- |
| 44,095 | Hughes | Sept. 6, 1864 |
| 505,565 | Bradford | Sept. 26, 1893 |
| 735,567 | McGowan | Aug. 4, 1903 |
| 740,019 | Hutton | Sept. 29, 1903 |
| 994,752 | Kirchoff | June 13, 1911 |
| 2,278,298 | Young | Mar. 31, 1942 |
| 2,396,928 | Parsons | Mar. 19, 1946 |

FOREIGN PATENTS

| Number | Country | Date |
| --- | --- | --- |
| 666,024 | Germany | Sept. 22, 1938 |